United States Patent
Matsumoto et al.

(10) Patent No.: US 11,062,082 B2
(45) Date of Patent: Jul. 13, 2021

(54) FILE GENERATION METHOD, FILE GENERATION APPARATUS, AND NON-TRANSITORY COMPUTER-READABLE STORAGE MEDIUM FOR STORING PROGRAM

(71) Applicant: FUJITSU LIMITED, Kawasaki (JP)

(72) Inventors: Satoshi Matsumoto, Yokohama (JP); Masahiro Kataoka, Kamakura (JP); Tomonori Ota, Kawasaki (JP); Junya Hiramatsu, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 295 days.

(21) Appl. No.: 16/225,817

(22) Filed: Dec. 19, 2018

(65) Prior Publication Data

US 2019/0205366 A1 Jul. 4, 2019

(30) Foreign Application Priority Data

Jan. 4, 2018 (JP) .............................. JP2018-000177

(51) Int. Cl.
*G06F 17/21* (2006.01)
*G06F 40/157* (2020.01)
(Continued)

(52) U.S. Cl.
CPC .......... *G06F 40/157* (2020.01); *G06F 21/602* (2013.01); *G06F 40/126* (2020.01);
(Continued)

(58) Field of Classification Search
CPC .... G06F 40/126; G06F 40/157; G06F 40/242; G06F 40/289; G06F 21/602; G06F 21/56;
(Continued)

(56) References Cited

U.S. PATENT DOCUMENTS 5,642,522 A * 6/1997 Zaenen ................. G06F 40/253
715/246
2003/0232503 A1 12/2003 Masuda
(Continued)

FOREIGN PATENT DOCUMENTS

JP 2004-022718 1/2004
JP 2012-043242 3/2012
(Continued)

*Primary Examiner* — Md S Elahee
(74) *Attorney, Agent, or Firm* — Fujitsu Patent Center

(57) ABSTRACT

A method for generating a file includes: executing a reception process that includes receiving text information; executing a first generation process that includes detecting a phrase that is included in the received text information and is of a specific type, generating encoded information by encoding the phrase of the specific type, and generating a first dictionary in which the encoded information is associated with the phrase of the specific type before the encoding; and executing a second generation process that includes generating a first file including a first region and multiple second regions, the first region being configured to store the encoded information, wherein a third region corresponding to the specific type among the second regions is configured to store encrypted dictionary information obtained by encrypting the first dictionary.

20 Claims, 14 Drawing Sheets

(51) Int. Cl.
*H04L 9/14* (2006.01)
*G06F 21/60* (2013.01)
*G06F 40/126* (2020.01)
*G06F 40/242* (2020.01)
*G06F 40/289* (2020.01)

(52) U.S. Cl.
CPC .......... *G06F 40/242* (2020.01); *G06F 40/289* (2020.01); *H04L 9/14* (2013.01); *H04L 2209/04* (2013.01); *H04L 2209/34* (2013.01)

(58) Field of Classification Search
CPC ............... G06F 17/2785; G06F 40/253; H04L 2209/34; H04L 2209/04; H04L 9/14; H04L 9/0618; H04W 28/06
USPC .............................................. 713/183; 704/10
See application file for complete search history.

(56) References Cited

U.S. PATENT DOCUMENTS

| | | | |
|---|---|---|---|
| 2012/0216046 A1* | 8/2012 | McDougal | G06F 21/56 713/183 |
| 2012/0288088 A1* | 11/2012 | Chang | H04L 9/0618 380/28 |
| 2014/0195626 A1 | 7/2014 | Ruff et al. | |
| 2017/0017619 A1 | 1/2017 | Kataoka et al. | |
| 2017/0367006 A1* | 12/2017 | Ino | H04W 28/06 |
| 2018/0173698 A1* | 6/2018 | Dubey | G06F 17/2785 |

FOREIGN PATENT DOCUMENTS

| | | |
|---|---|---|
| JP | 2016-510459 | 4/2016 |
| JP | 2017-022666 | 1/2017 |

* cited by examiner

FIG. 5

| 2-GRAMS | BIT MAP | FIRST POINTER (2)(3)(4)(5)(6)... | WORD | STATIC CODE |
|---|---|---|---|---|
| aa | 0_0_0_0_0 | | a | 25h |
| ab | 1_0_0_0_0 | | ⋮ | ⋮ |
| ac | 1_0_0_0_0 | | able | 6005h |
| .. | 0_1_0_0_0 | | ⋮ | ⋮ |
| | ⋮ | | abject | 6008h |
| .. | | | ⋮ | ⋮ |
| aΔ | | | about | 6028h |
| bl | 0_1_0_0_0 | | above | 602Eh |
| bo | 0_1_0_0_0 | | ⋮ | ⋮ |
| ct | 0_1_0_0_0 | | act | 6041h |
| | | | acted | 6041h |
| | | | acting | 6041h |
| eΔ | 0_0_0_1_1 | | ⋮ | ⋮ |
| le | 0_0_1_0_0 | | as | 32h |
| | | | ⋮ | ⋮ |
| | | | eat | 60F5h |
| | | | eating | 60F5h |
| tΔ | 0_0_1_0_0 | | ⋮ | ⋮ |

FIG. 7

| TYPE | ADDRESS | ATTRIBUTE INFORMATION | ENCRYPTION |
|---|---|---|---|
| 1 | A000h | LOW-FREQUENCY WORD | – |
| 2 | A100h | NAME | ○ |
| 3 | A200h | NUMERICAL VALUE | ○ |
| 4 | A300h | TAG | – |
| 5 | A400h | TIME | – |
| ... | | | |

124

FIG. 11
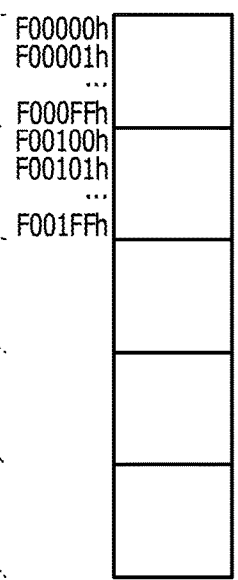
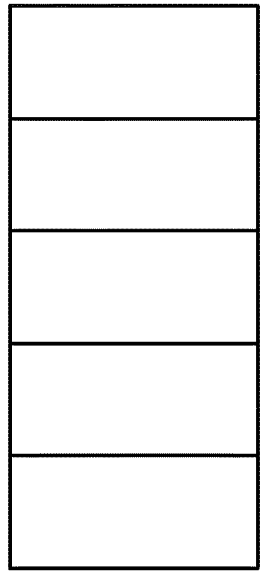
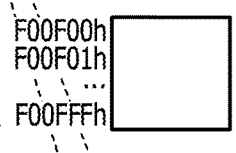

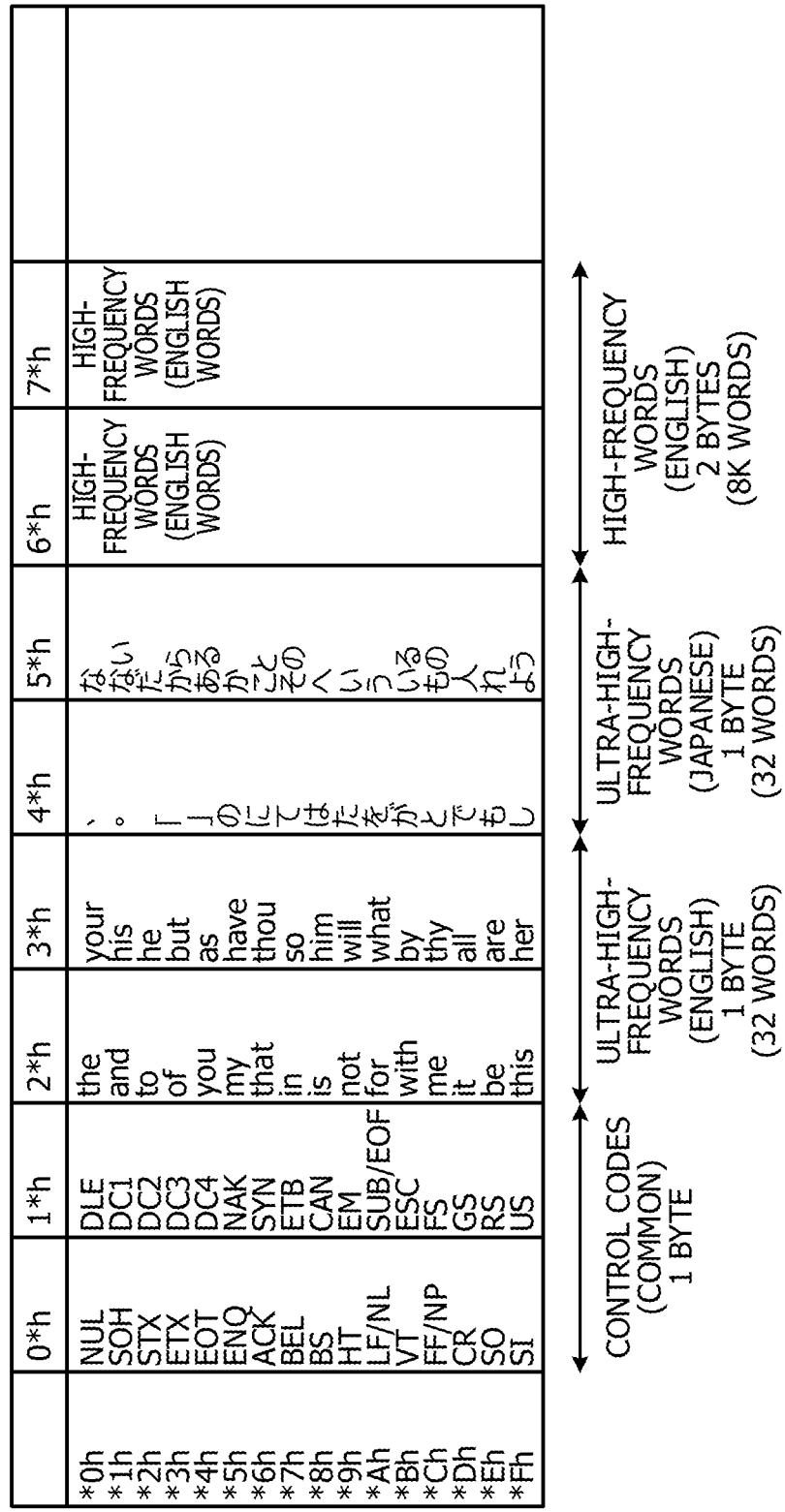

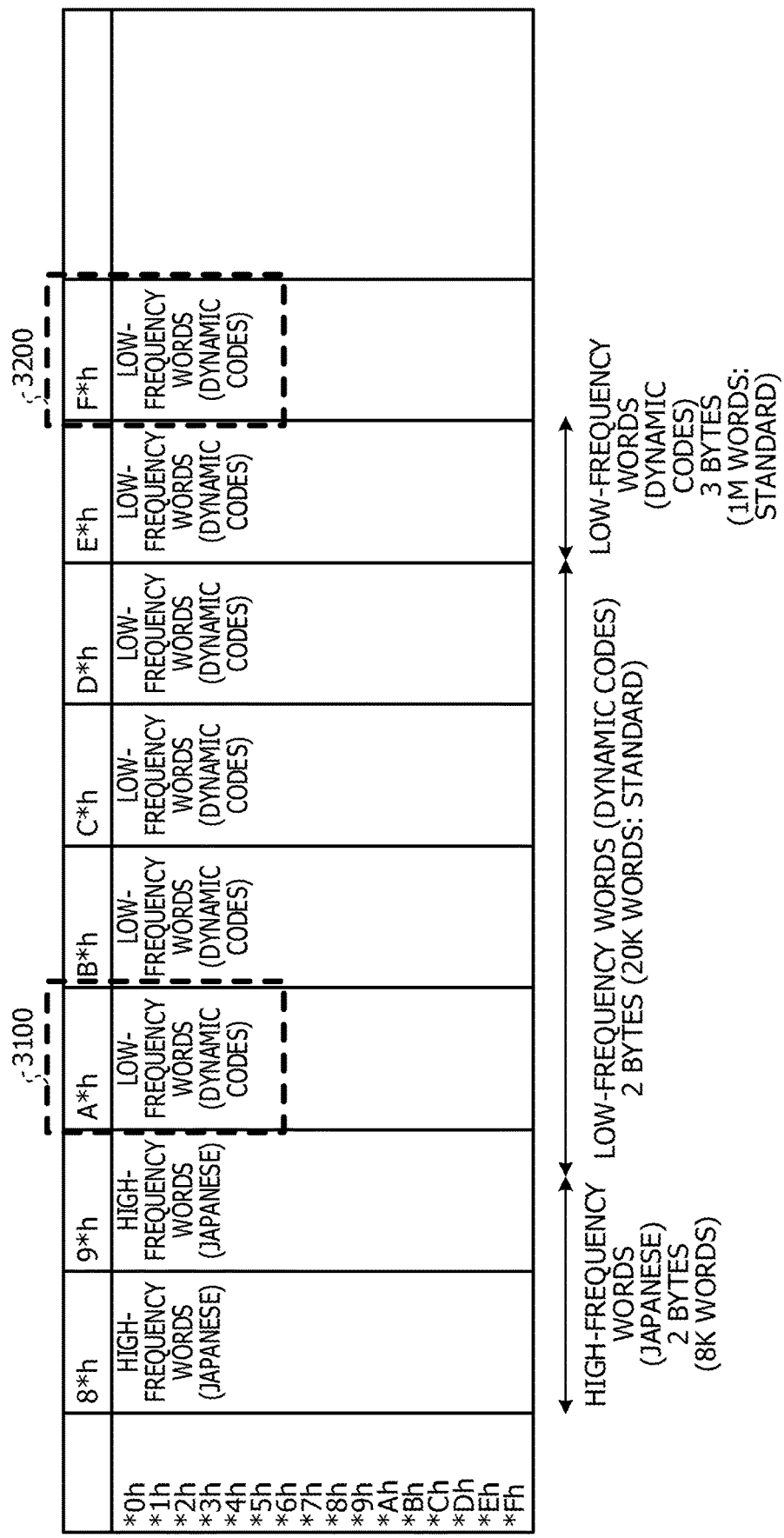

FILE GENERATION METHOD, FILE GENERATION APPARATUS, AND NON-TRANSITORY COMPUTER-READABLE STORAGE MEDIUM FOR STORING PROGRAM

CROSS-REFERENCE TO RELATED APPLICATION

This application is based upon and claims the benefit of priority of the prior Japanese Patent Application No. 2018-177, filed on Jan. 4, 2018, the entire contents of which are incorporated herein by reference.

FIELD

The embodiments discussed herein are related to a file generation method, a file generation apparatus, and a non-transitory computer-readable storage medium for storing a program.

BACKGROUND

A technique for compressing and encoding text data on a character string basis or on a word basis is known. For example, a technique is known, which replaces, with a code, a characteristic string registered in a static dictionary and included in a file to be compressed, assigns a new compressed code to a characteristic string not registered in the static dictionary, stores the characteristic string, the new compressed code, and a region for preliminary encoding in a dynamic dictionary so that the characteristic string, the new compressed code, and the region for preliminary encoding are associated with each other in the dynamic dictionary.

In addition, a technique for setting security levels for items of encoded text data is known. For example, a technique for selecting items of information to be supplied to a user based on a payment method requested by the user and an authentication level of the user is known. In addition, a technique for displaying options indicating whether or not a single character string entered by a user is to be encrypted is known. In this technique, when an option indicating that the character string is to be encrypted is selected by the user, the character string is encrypted and converted to a fixed character string, and when an option indicating that the character string is not to be encrypted is selected by the user, the character string is not encrypted and is converted to a fixed character string and document data is generated. Furthermore, a technique for placing multiple masking objects at arbitrary positions in an image and determining whether or not items are to be masked based on, for example, a device for outputting, a document property, and an access right is known.

Examples of related art are Japanese Laid-open Patent Publication No. 2017-22666, Japanese National Publication of International Patent Application No. 2016-510459, Japanese Laid-open Patent Publication No. 2012-43242, and Japanese Laid-open Patent Publication No. 2004-22718.

SUMMARY

According to an aspect of the embodiments, a method for generating a file includes: executing a reception process that includes receiving text information; executing a first generation process that includes detecting a phrase that is included in the received text information and is of a specific type, generating encoded information by encoding the phrase of the specific type, and generating a first dictionary in which the encoded information is associated with the phrase of the specific type before the encoding; and executing a second generation process that includes generating a first file including a first region and multiple second regions, the first region being configured to store the encoded information, wherein a third region corresponding to the specific type among the second regions is configured to store encrypted dictionary information obtained by encrypting the first dictionary.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating an example of a static bit filter according to the first embodiment;

FIG. 7 is a diagram illustrating an example of a type table according to the first embodiment;

FIG. 11 is a second diagram illustrating an example of association relationships between a dynamic dictionary and encrypted regions;

FIGS. 12A and 12B are a diagram illustrating an example of shifts in codes according to a second embodiment.

DESCRIPTION OF EMBODIMENTS

In the aforementioned techniques, it is difficult to compress and encode multiple text data items and execute block encryption to collectively encrypt information of a specific type. In the aforementioned techniques, when the information that is included in the text data items and is of the specific type is tried to be individually encrypted, a data size may increase or a word may be separated at a boundary of the block encryption.

According to an aspect, the present disclosure aims to provide a file generation program, a file generation method, and a file generating device that compress and encode text information and execute block encryption to collectively encrypt words of a specific type.

Hereinafter, embodiments of the file generation program disclosed herein, the file generation method disclosed herein, and the file generating device disclosed herein are described in detail with reference to the accompanying drawings. The disclosure, however, is not limited to the embodiments. The embodiments described below may be combined without contradiction.

First Embodiment

Figure 1:
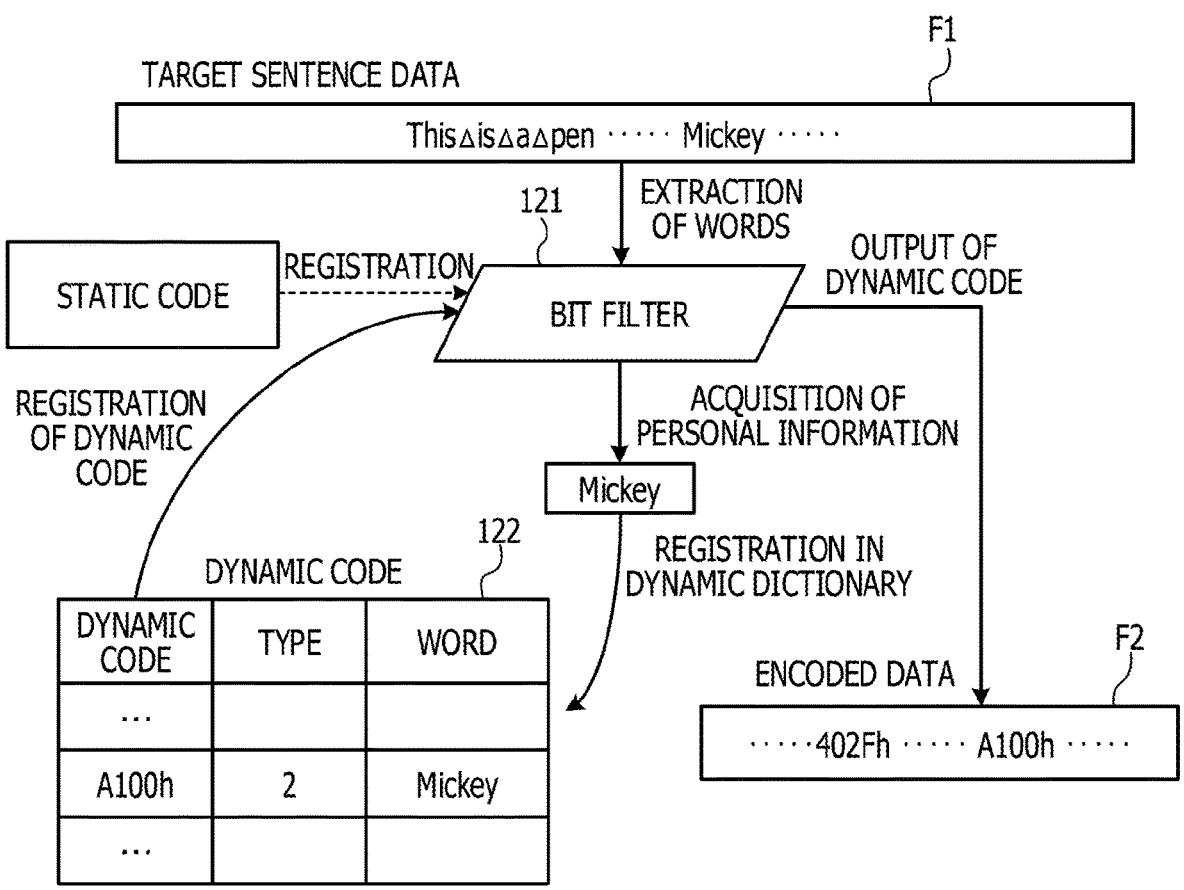
FIG. 1 is a diagram describing a process of encoding a word according to a first embodiment.

An encoding process to be executed by a generating device 100 according to a first embodiment is described with reference to FIG. 1. FIG. 1 is a diagram describing the process of encoding a word according to the first embodiment. As illustrated in FIG. 1, the generating device 100 separates a sentence "ThisΔisΔaΔpen . . . MickeyΔ . . . " included in target sentence data F1 to be subjected to the encoding process into words "ThisΔ", "isΔ", "aΔ", "penΔ", and the like and acquires the words that are data to be encoded. The target sentence data F1 is an example of text information. In this specification, "Δ" indicates a blank.

For example, the generating device 100 extracts data "MickeyΔ" as data to be encoded, outputs the extracted data "MickeyΔ" to a bit filter 121, and determines whether or not a static code associated with the extracted data to be encoded is already registered in the bit filter 121. The bit filter 121 is a dictionary in which each of words is associated with a static code or a dynamic code. For example, in the bit filter 121, ultra-high-frequency words such as "ThisΔ", "isΔ", "aΔ", and "penΔ" and static codes associated with the words are registered in advance. A data structure of the bit filter 121 is described later in detail. Static codes and dynamic codes are an example of encoded information.

When the static code associated with the extracted data "MickeyΔ" to be encoded is not registered in the bit filter 121, the generating device 100 determines whether attribute information of the data "MickeyΔ" corresponds to a low-frequency word, a name, a numerical value, or a tag. When the generating device 100 determines that the data "MickeyΔ" is a name, the generating device 100 associates a dynamic code ("A100h" in this case) with a type ("2" in this case) indicating the name and registers the dynamic code and the type in a dynamic dictionary 122. "h" that is the end of the dynamic code "A100h" is a code indicating that the dynamic code is expressed in hexadecimal notation. Attribute information of words is described later. The dynamic dictionary 122 is an example of a first dictionary.

Then, the generating device 100 associates the dynamic code "A100h" dynamically added to the dynamic dictionary 122 with the data "MickeyΔ" and registers the dynamic code "A100h" and the data "MickeyΔ" in the bit filter 121. Then, the generating device 100 acquires the dynamic code "A100h" associated with the word "MickeyΔ" based on the bit filter 121 and the dynamic dictionary 122 and outputs the acquired dynamic code "A100h" to encoded data F2.

In addition, when the word "MickeyΔ" appears in the target sentence data F1 next, the generating device 100 acquires the dynamic code "A100h" registered in the bit filter 121 and outputs the acquired dynamic code "A100h" to the encoded data F2.

When the generating device 100 determines that a static code associated with extracted data to be encoded is already registered, the generating device 100 acquires the static code and outputs the acquired static code to the encoded data F2. For example, when "402Fh" is already registered as a static code associated with data "penΔ" to be encoded, the generating device 100 acquires the static code "402Fh" and outputs the acquired static code "402Fh" to the encoded data F2.

Figure 2:
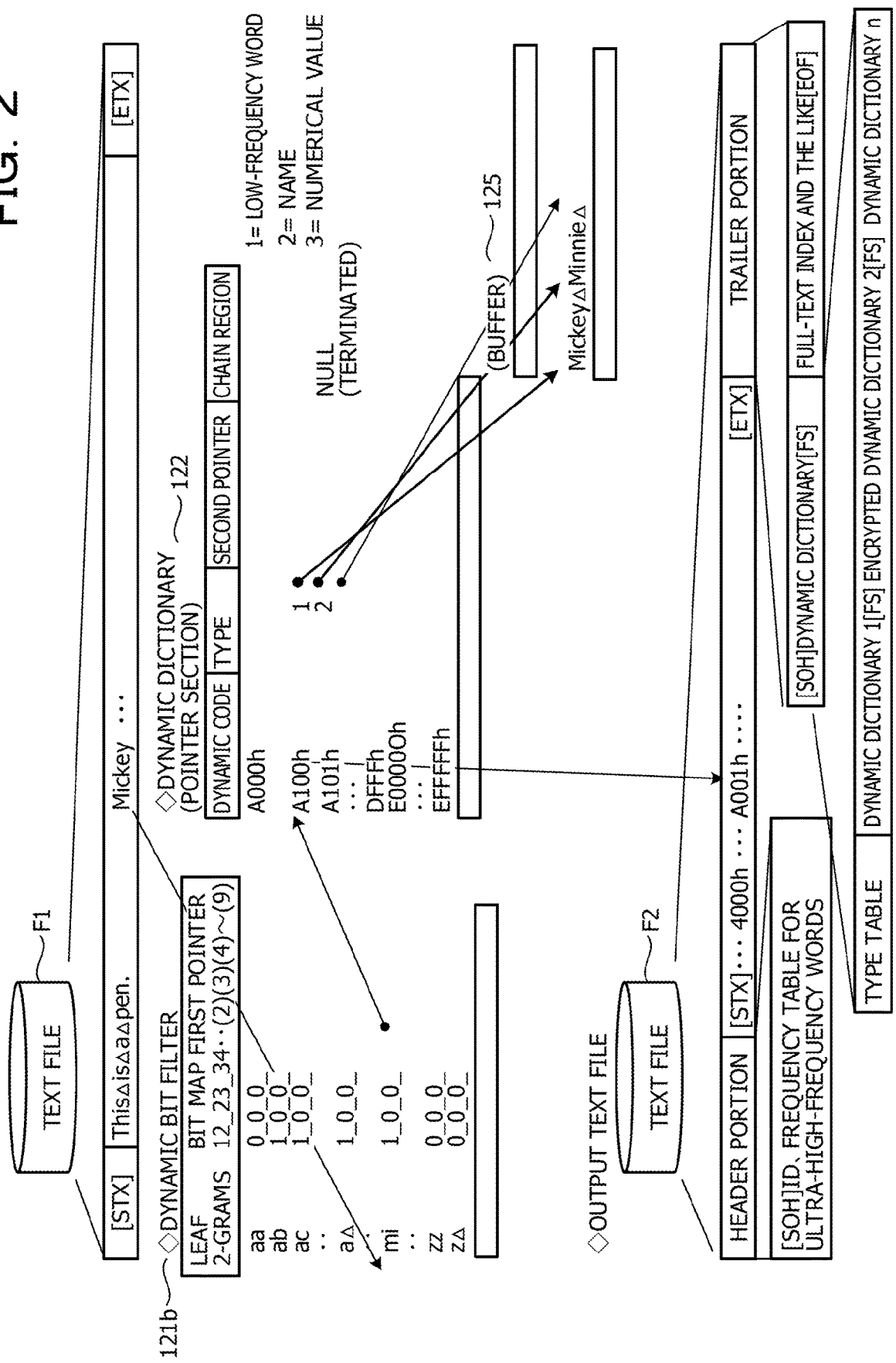
FIG. 2 is a diagram describing an example of a generation process according to the first embodiment.

The encoded data F2 illustrated in FIG. 1 is described in detail with reference to FIG. 2. FIG. 2 is a diagram describing an example of a generation process according to the first embodiment. As illustrated in FIG. 2, the encoded data F2 includes a header portion, a text portion, and a trailer portion. The header portion includes an ID of the encoded data F2 and a frequency table for ultra-high-frequency words registered in a static bit filter. The text portion includes data obtained by encoding the target sentence data F1. The trailer portion includes an index of the target sentence data F1 and a dynamic dictionary.

As illustrated in FIG. 2, the dynamic dictionary included in the encoded data F2 includes a type table 124 defining attribute information of words included in the dynamic dictionary and includes data obtained by encrypting one or more of multiple portions included in the dynamic dictionary 122 and corresponding to specific attribute information. A data structure of the type table 124 is described later in detail.

Figure 3:
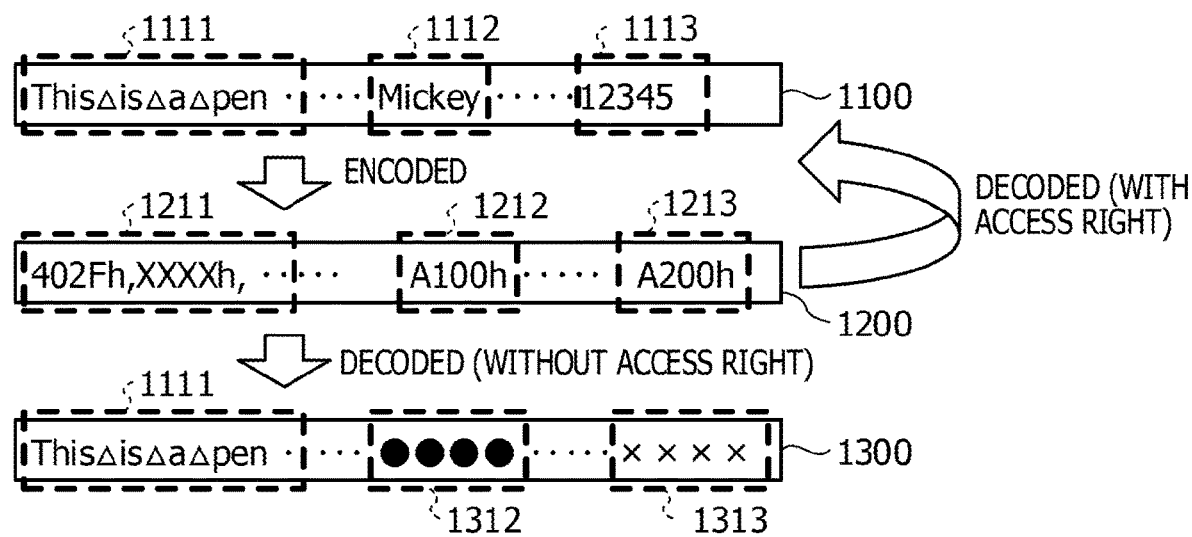
FIG. 3 is a diagram illustrating an example of a text file according to the first embodiment.

A process of encoding a text file according to the first embodiment and a process of decoding an encoded text according to the first embodiment are described with reference to FIG. 3. FIG. 3 is a diagram illustrating an example of a text file according to the first embodiment. As illustrated in FIG. 3, the generating device 100 receives an input text file 1100 having a portion 1111 including ultra-high-frequency words, a portion 1112 including a name, and a portion 1113 including a numerical value and executes the encoding process on the text file 1100 to generate an encoded text 1200. The encoded text 1200 includes codes 1211 corresponding to the ultra-high-frequency words, a code 1212 corresponding to the name, and a code 1213 corresponding to the numerical value. In the first embodiment, information included in the portion 1112 including the name and the portion 1113 including the numerical value is personal information such as the name and a phone number, for example. A portion included in the dynamic dictionary 122 and corresponding to the portion 1112 including the name corresponds to an encrypted dynamic dictionary 2 illustrated in FIG. 2, for example. A portion included in the dynamic dictionary 122 and corresponding to the portion 1113 including the numerical value corresponds to an encrypted dynamic dictionary 3 (not illustrated), for example.

When the generating device 100 receives a request to decode the encoded text 1200 from a user (not illustrated), the generating device 100 determines an access right of the user who has requested the decoding. When the generating device 100 determines that the user has the right to access the personal information, the generating device 100 outputs the text file 1100 including the decoded information included in the portion 1112 including the name and the portion 1113 including the numerical value, as illustrated in FIG. 3.

When the generating device 100 determines that the user does not have the right to access the personal information, the generating device 100 outputs a text 1300 including masked information included in the portion 1112 including the name and the portion 1113 including the numerical value. As illustrated in FIG. 3, the text 1300 includes a portion 1312 obtained by masking the portion 1112 including the name and a portion 1313 obtained by masking the portion 1113 including numerical value. As illustrated in FIG. 3, the generating device 100 may change one or more of a masking type of the portion 1312 corresponding to the name, a masking type of the portion 1313 corresponding to the numerical value, the number of characters to be masked and included in the portion 1312 corresponding to the name, and the number of characters to be masked and included in the portion 1313 corresponding to the numerical value. The user is an example of a person who has requested output.

As described above, since the generating device 100 according to the first embodiment encodes words of a specific type, which are included in a sentence and are not stored in the static dictionary, and generates a file including information obtained by encoding the dictionary in which codes are associated with words, the generating device 100 may execute block encryption to collectively encrypt the words of the specific type upon the encoding.

Functional Blocks

Figure 4:
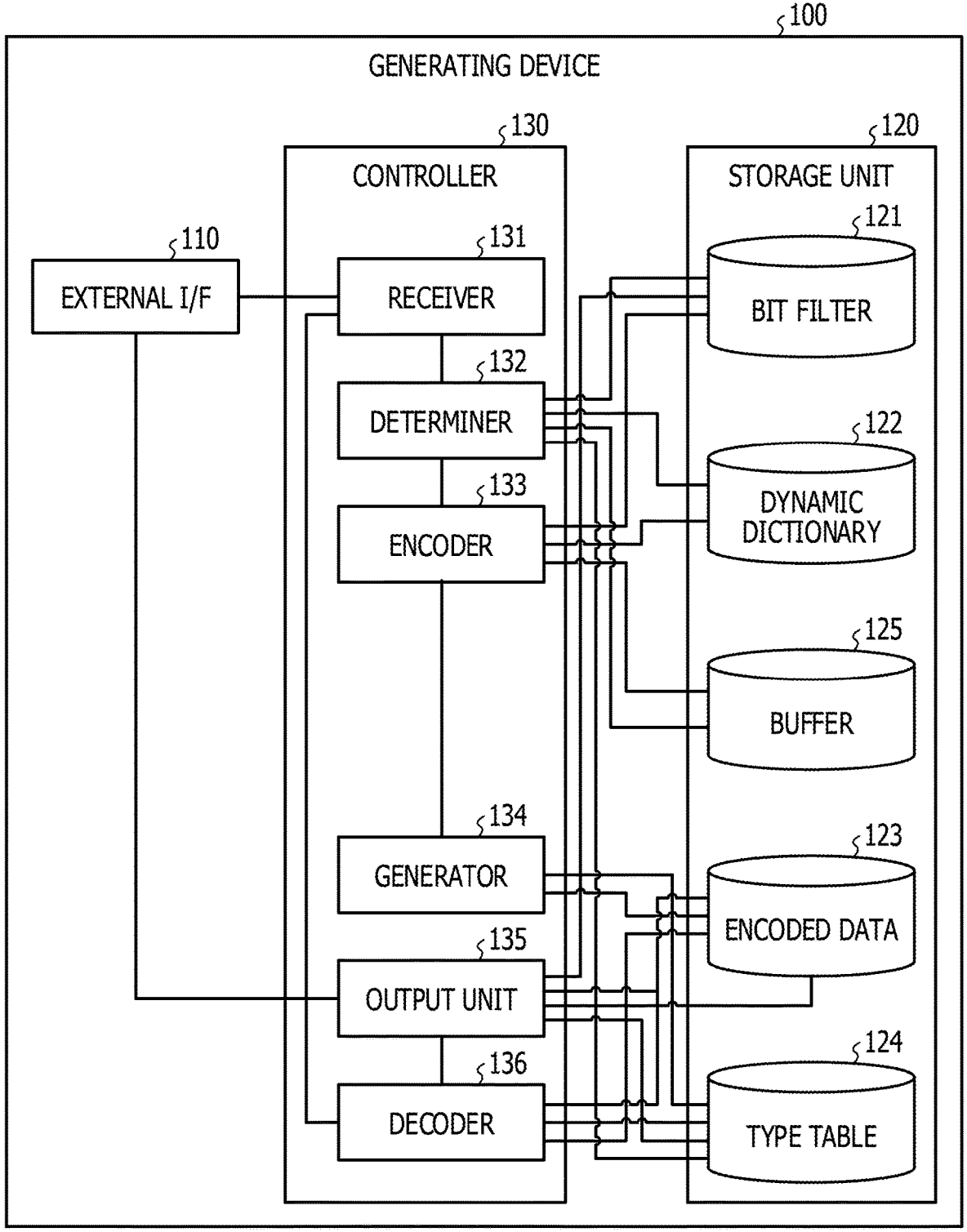
FIG. 4 is a diagram illustrating an example of a generating device according to the first embodiment.

Next, an example of the generating device according to the first embodiment is described with reference to FIG. 4. FIG. 4 is a diagram illustrating the example of the generating device according to the first embodiment. As illustrated in FIG. 4, the generating device 100 according to the first embodiment includes an external I/F 110, a storage unit 120, and a controller 130. In this specification, an interface is referred to as "I/F" in some cases.

The external I/F 110 controls communication with another computer such as a user terminal (not illustrated) of the generating device 100 via a cable or wirelessly. The external I/F 110 is, for example, a communication interface such as a network interface card (NIC), but is not limited to this. The external I/F 110 may be an interface with a display device (not illustrated) and an operation device (not illustrated).

The storage unit 120 is an example of a storage device configured to store a program and data. For example, the storage unit 120 is a memory, a processor, or the like. The storage unit 120 includes the bit filter 121, the dynamic dictionary 122, encoded data 123, the type table 124, and a buffer 125.

The bit filter 121 stores characteristic strings, static codes, and dynamic codes so that each of the characteristic strings is associated with a static or dynamic code in the bit filter 121. The following description assumes that the bit filter 121 includes a static bit filter 121a and a dynamic bit filter 121b. In the static bit filter 121a, ultra-high-frequency words are associated with static codes. In the dynamic bit filter 121b, words other than the ultra-high-frequency words are associated with dynamic codes. FIG. 5 is a diagram illustrating an example of the static bit filter according to the first embodiment.

As illustrated in FIG. 5, for example, the static bit filter 121a stores pairs of "2-grams", "bit maps", "first pointers", "words", and "static codes" so that the pairs of "2-grams", the "bit maps", the "first pointers", the "words", and the "static codes" are associated with each other in the static bit filter 121a. The information stored in the static bit filter 121a is input from an external database in advance, for example. The static bit filter 121a is an example of a third dictionary.

In the static bit filter 121a, each of the pairs of "2-grams" are information indicating a character string (or 2 words) of 2 characters. The "bit maps" indicate bit maps associated with the character strings of the pairs of 2-grams. For example, a bit map associated with "ab" is "1_0_0_0_0". This bit map indicates a word including the character string "ab" as first and second characters.

The "first pointers" point to positions of the static codes associated with the bit maps. The first pointers pointing to positions where words having, at top portions, the character strings stored in a "2-grams" field of the static bit filter 121a are stored are stored for the numbers of characters of the words. For example, a pointer for a word "able" is stored in (4) of a first pointer field of the static bit filter 121a in a record in which "ab" is stored in the "2-grams" field and "1_0_0_0_0" is stored in a bit map field of the static bit filter 121a.

The "static codes" store static codes corresponding to the words. As illustrated in FIG. 5, the static bit filter 121a stores information indicating that a static code associated with the word "able" is "6005h".

Figure 6:
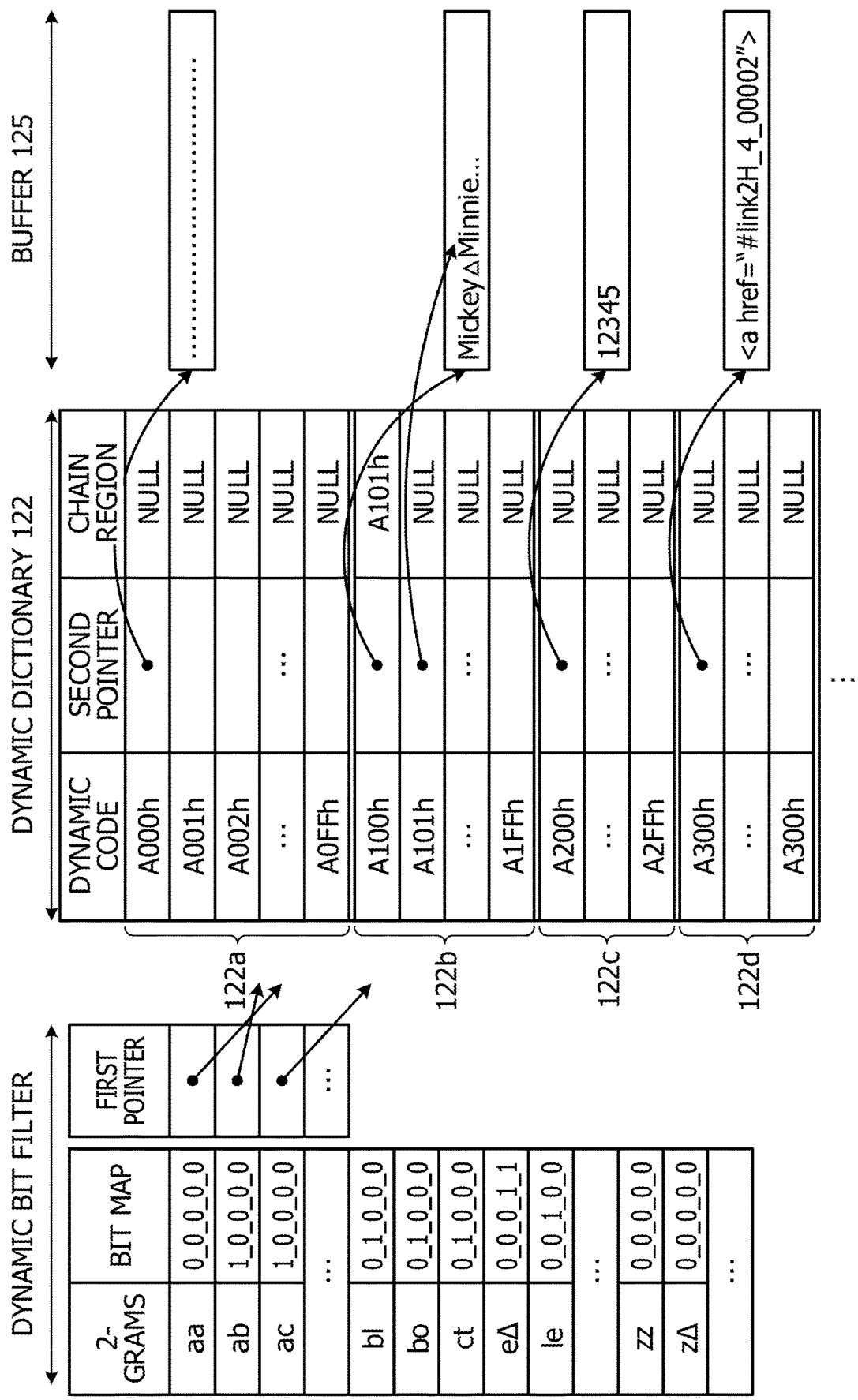
FIG. 6 is a diagram illustrating an example of a data structure related to a static dictionary according to the first embodiment.

As illustrated in FIG. 6, the dynamic bit filter 121b is associated with information stored in the dynamic dictionary 122 by the pointers of the dynamic bit filter 121b. FIG. 6 is a diagram illustrating an example of a data structure related to the dynamic dictionary according to the first embodiment. Information stored in the dynamic bit filter 121b is input by a determiner 132 described later, for example.

As illustrated in FIG. 6, the dynamic bit filter 121b stores pairs of "2-grams", "bit maps", and "first pointers" so that the pairs of "2-grams", the "bit maps", and the "first pointers" are associated with each other in the dynamic bit filter 121b. The pairs of "2-grams" and "bit maps" included in the dynamic bit filter 121b are the same as those included in the static bit filter 121a, and a description thereof is omitted. In the dynamic bit filter 121b, the "first pointers" point to dynamic codes associated with the bit maps. As illustrated in FIG. 6, since dynamic codes according to the first embodiment are, for example, stored in the dynamic dictionary 122, the pointers stored in the dynamic bit filter 121b point to addresses of the dynamic codes illustrated in FIG. 6.

In the dynamic bit filter 121b, since 2-grams of the word "Mickey" are "mi" and the number of characters of the word "Mickey" is 6, a pointer for the word "Mickey" is stored in (6) of a first pointer field of the dynamic bit filter 121b in a record in which "1_0_0_0_0" is stored in a bit map field of the dynamic bit filter 121b. For example, since a top character string of "Minnie" and the number of characters of "Minnie" are the same as those of "Mickey", a pointer for "Minnie" is stored at the same position as the pointer for "Mickey".

The dynamic dictionary 122 stores addresses of words stored in the buffer 125 and dynamic codes so that the addresses are associated with the dynamic codes in the dynamic dictionary 122. The dynamic dictionary 122 stores "dynamic codes", "second pointers", and "chain regions" so that the "dynamic codes", the "second pointers", and the "chain regions" are associated with each other in the dynamic dictionary 122. The dynamic codes stored in the dynamic dictionary 122 are identified by first pointers of the dynamic bit filter 121b illustrated in FIG. 6. The information stored in the dynamic dictionary 122 is input by the determiner 132 described later, for example.

In FIG. 6, the "dynamic codes" are codes assigned to words stored in the buffer 125. The "second pointers" are information indicating positions in the buffer 125 at which words associated with the dynamic codes are stored. For example, a second pointer associated with a dynamic code "A100h" points to a top position of "Mickey" stored in the buffer 125. This indicates that the word "Mickey" is already dynamically encoded to the dynamic code "A100h".

In the dynamic dictionary 122, the chain regions are information indicating whether or not corresponding character strings are chained due to the duplication of pointers from the dynamic bit filter 121b. When 2-grams of a character string and the number of characters of the character string match those of a character string associated with a dynamic code, a chain region associated with the dynamic code stores the dynamic code associated with the characteristic string. For example, "A101h" is registered in a chain region for the dynamic code "A100h". This indicates that since 2-grams of "Mickey" associated with the dynamic code "A100h" and 2-grams of "Minnie" associated with the dynamic code "A101h" are "Mi", and the number of characters of "Mickey" and the number of characters of "Minnie" are 6, "Mickey" and "Minnie" have a chain relationship. When character strings are not chained together, or when a top character string of a certain word and the number of characters of the certain word do not match those of another word, "NULL" is set in a chain region for the certain word.

The dynamic dictionary 122 may include multiple portions based on types of attribute information of words. The attribute information of the words includes "low-frequency words", "names", and "numerical values". The "low-frequency words" are not names and appear in texts with low frequency. The "names" include proper nouns such as names of people. The "numerical values" include individual numbers and phone numbers. In the example illustrated in FIG. 6, the dynamic dictionary 122 includes a portion 122a corresponding to the "low-frequency words", a portion 122b corresponding to the "names", a portion 122c corresponding to the "numerical values", and a portion 122d corresponding to tags. The portions 122a to 122d illustrated in FIG. 6 are an example. The dynamic dictionary 122 may further include portions corresponding to words of other types such as "time" and "URLs".

The encoded data 123 stores data obtained by encoding the input target sentence data F1. The encoded data 123 stores the encoded data F2 including the header portion, the text portion, and the trailer portion, as illustrated in FIG. 2, for example. The information stored in the encoded data 123 is input by an encoder 133 described later, for example.

The type table 124 stores association relationships between dynamic codes and attribute information of words. FIG. 7 is a diagram illustrating an example of the type table according to the first embodiment. As illustrated in FIG. 7, the type table 124 stores "types", "addresses", "attribute information", and "encryption" so that the "types", the "addresses", the "attribute information", and the "encryption" are associated with each other in the type table 124. The information stored in the type table 124 is input by an administrator of the generating device 100 in advance, for example.

In the type table 124, the "types" indicate identifiers uniquely identifying types of attribution information of words. The "addresses" indicate addresses at which dynamic codes of the words of the types are stored. The "attribute information" indicates attribute information of the types such as a "name" and a "low-frequency word". The "encryption" indicates whether or not portions included in the dynamic dictionary 122 and associated with the types are to be encrypted.

As illustrated in FIG. 7, for example, the type table 124 stores information indicating that words of a type "1" are "low-frequency words", dynamic codes associated with the words are stored at addresses "A000h" to "A0FFh", and portions included in the dynamic dictionary 122 and associated with the addresses are not encrypted. For example, the type table 124 stores information indicating that words of a type "2" are "names", dynamic codes associated with the words are stored at addresses "A100h" to "A1FFh", and portions included in the dynamic dictionary 122 and associated with the addresses are encrypted. In addition, the type table 124 stores not only "names" and "numerical values but also types such as "tags" and "time" so that the "names", the "numerical values", the "tags", the "time", and the like are associated with dynamic codes in the type table 124.

The buffer 125 stores words before the words are encoded using dynamic codes. As illustrated in FIG. 6, the buffer 125 stores words associated with dynamic codes registered in the dynamic dictionary 122. The words stored in the buffer 125 are identified by second pointers of the dynamic dictionary 122 illustrated in FIG. 6. The information stored in the buffer 125 is input by the determiner 132 described later, for example. The buffer 125 is an example of a second dictionary.

Returning to FIG. 4, the controller 130 is a processing unit configured to control the entire generating device 100. The controller 130 is a processor or the like, for example. The controller 130 includes a receiver 131, the determiner 132, an encoder 133, a generator 134, an output unit 135, and a decoder 136. The receiver 131, the determiner 132, the encoder 133, the generator 134, the output unit 135, and the decoder 136 are an example of electronic circuits included in the processor or are an example of processes to be executed by the processor.

The receiver 131 receives the input target sentence data F1 from the user terminal via the external I/F 110. The receiver 131 outputs the received target sentence data F1 to the determiner 132.

The receiver 131 receives a request to output a text from the user terminal and outputs the received request to the decoder 136.

The determiner 132 determines whether or not words included in the target sentence data F1 are already registered in the bit filter 121 or whether or not a static or dynamic code associated with each of the words is already registered.

The determiner 132 extracts the words from the target sentence data F1 using a known morphological analysis technique or the like upon receiving the input target sentence data F1 from the receiver 131. The determiner 132 compares the bit maps associated with pairs of 2-grams included in the extracted words with the pointers of the bit filter 121 and identifies words at positions pointed by the pointers associated with the bit maps. The determiner 132 searches words corresponding to the words in the order that the words have been identified.

When the same word as a word extracted by the determiner 132 exists in the static bit filter 121a, the determiner 132 determines that the word has been hit in the static bit filter 121a. Then, the determiner 132 outputs the result of the determination to the encoder 133.

When the same word as a word extracted by the determiner 132 does not exist in the static bit filter 121a, the determiner 132 determines, via a first pointer of the static bit filter 121b, whether or not the same word as a word extracted by the determiner 132 exists in the buffer 125. When the same word as the extracted word exists in the buffer 125, the determiner 132 determines that the word has been hit in the dynamic dictionary 122. Then, the determiner 132 outputs the result of the determination to the encoder 133.

When the determiner 132 determines that the same word as the extracted word does not exist in the buffer 125, the determiner 132 identifies the type of the word and newly registers a dynamic code associated with the word in a portion included in the dynamic dictionary 122 and corresponding to the type. First, the determiner 132 uses a technique such as known pattern matching to determine whether or not the word is associated with any of the types such as a low-frequency word, a name, a numerical value, a tag, and time. The determiner 132 adds the word to the buffer 125 and adds a pointer pointing to an address of the word to second pointers of the dynamic dictionary 122. Then, the determiner 132 registers the dynamic code associated with the word in the portion included in the dynamic dictionary 122 and corresponding to the type.

For example, when the determiner 132 determines that a dynamic code associated with a word "1234567890" is not registered in the dynamic dictionary 122, the determiner 132 identifies the type of the concerned word. For example, when the determiner 132 determines that the concerned word is of the type "numerical value", the determiner 132 adds the word "1234567890" to the buffer 125 and adds a pointer pointing to an address of the concerned word to second pointers of the dynamic dictionary 122. In addition, the determiner 132 registers the dynamic code associated with the concerned word in the portion 122c included in the dynamic dictionary 122 and corresponding to the type "numerical value" of the concerned word. Then, the determiner 132 outputs the registered dynamic code to the encoder 133.

The encoder 133 encodes the word extracted from the target sentence data F1 and causes the encoded data to be stored in the encoded data 123. When the encoder 133 receives the output determination result indicating that the word has been hit in the static bit filter 121a, the encoder 133 extracts a static code associated with the concerned word from the static bit filter 121a and encodes the concerned word.

When the encoder 133 receives the output determination result indicating that the word has been hit in the dynamic dictionary 122, the encoder 133 extracts the dynamic code associated with the concerned word from the dynamic dictionary 122 and encodes the word. In addition, when the encoder 133 receives the newly registered output dynamic code, the encoder 133 encodes the word using the received dynamic code.

The generator 134 attaches the partially or entirely encrypted dynamic dictionary 122 to encoded data to generate data to be stored in the encoded data 123. When the encoding of all words included in the target sentence data F1 is completed, the generator 134 executes block encryption such as known AES to encrypt a certain portion that is among the portions 122a to 122d included in the dynamic dictionary 122 and is indicated in the type table 124 storing information indicating that the certain portion is to be encrypted. In the first embodiment, the generator 134 encrypts the portion 122b corresponding to the names and the portion 122c corresponding to the numerical values. Then, the generator 134 causes the encoded data F2 including, in the trailer portion, the dynamic dictionary including the encrypted portions 122b and 122c and the unencrypted portions 122a and 122d to be stored in the encoded data 123.

The decoder 136 decodes a text stored in the encoded data 123 and outputs the decoded text in accordance with an output request from the user. When the decoder 136 receives, from the receiver 131, an output request to output a text including an ID of target data, the decoder 136 acquires encoded data corresponding to the output request. The decoder 136 references a header portion of data included in the encoded data 123 and extracts the encoded data matching the ID included in the request to output the text, for example.

The decoder 136 identifies the right to access the personal information of the user who has transmitted the output request. When the decoder 136 determines that the user has the access right, the decoder 136 decodes the encrypted portions 122b and 122c of the dynamic dictionary 122. Then, the decoder 136 uses the dynamic dictionary 122 including the decoded portions 122b and 122c to decode a text portion of the data extracted from the encoded data and outputs the decoded text portion of the data to the user terminal via the external I/F 110.

When the decoder 136 determines that the user does not have the access right, the decoder 136 does not decode the encrypted portions 122b and 122c of the dynamic dictionary 122 and uses the dynamic dictionary 122 to decode the text portion of the data extracted from the encoded data, for example. For example, the decoder 136 decodes the data extracted from the encoded data without decoding information including the personal information of the user who does not have the access right. Then, the decoder 136 outputs the decoded data to the user terminal via the external I/F 110. In this case, the decoder 136 may mask the information including the personal information and output the masked information, like the text 1300 illustrated in FIG. 3.

Flow of Process

Figure 8:
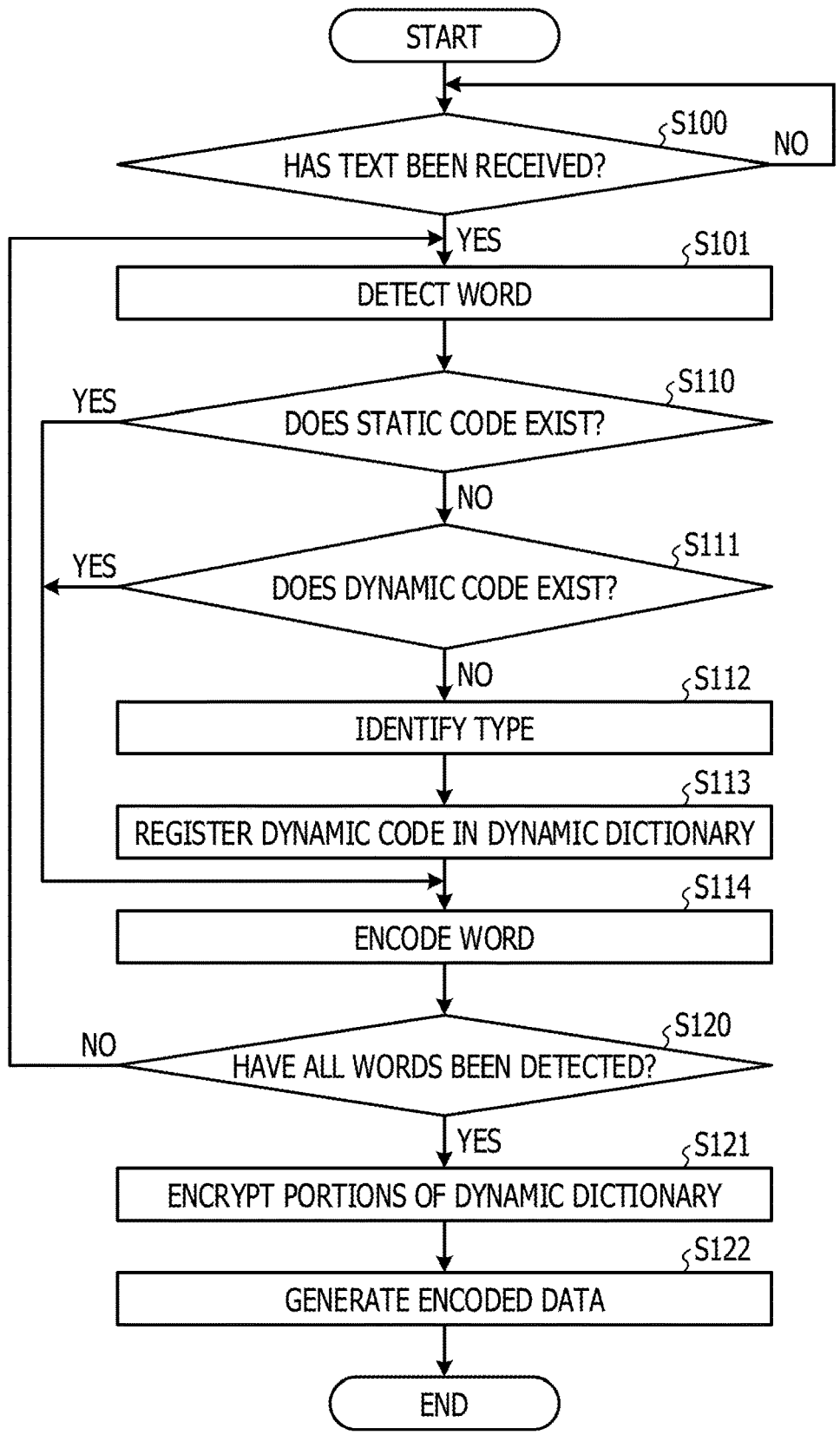
FIG. 8 is a flowchart of an example of the generation process according to the first embodiment.
Figure 9:
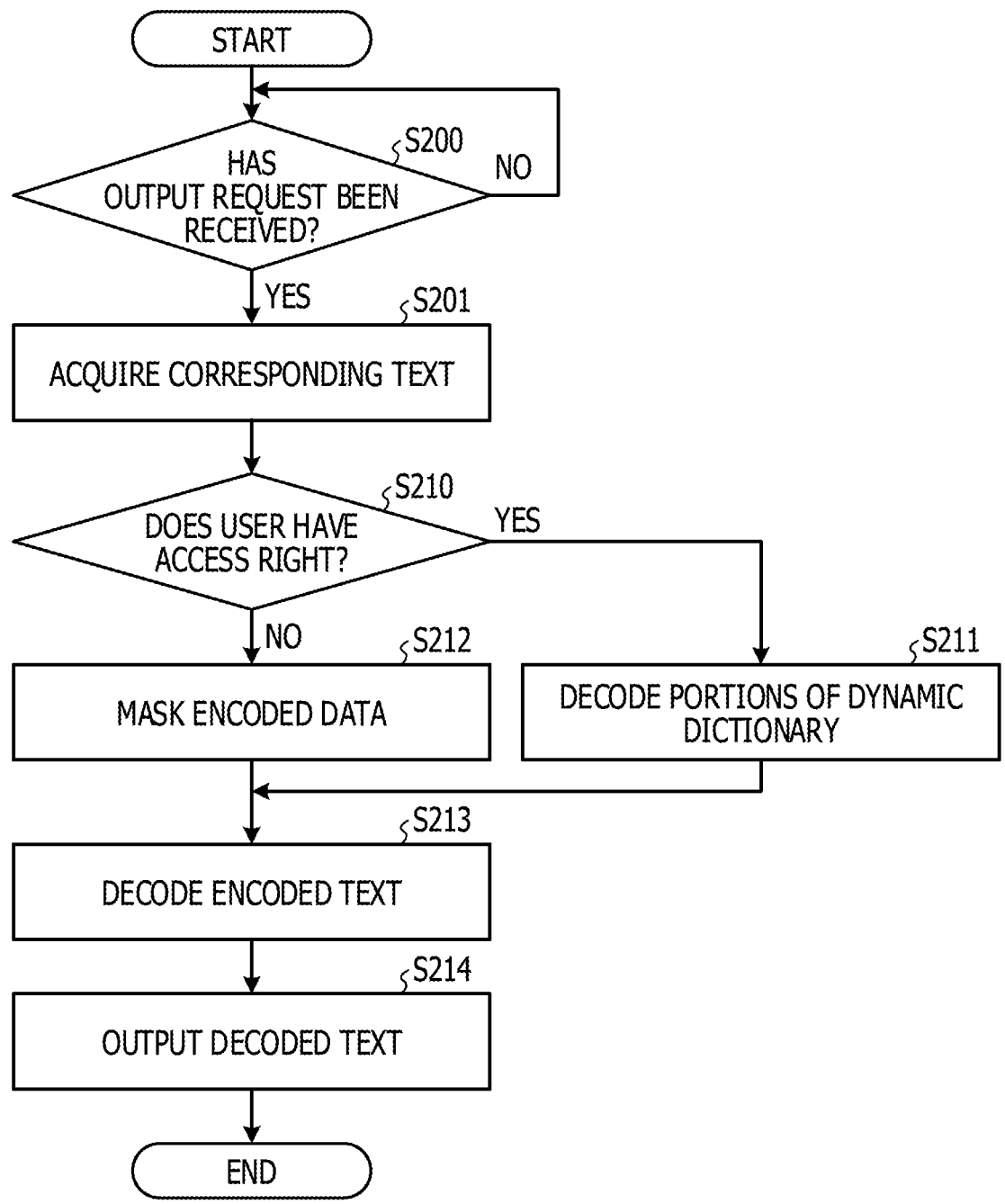
FIG. 9 is a flowchart of an example of a decoding process according to the first embodiment.

Next, processes according to the first embodiment are described with reference to FIGS. 8 and 9. FIG. 8 is a flowchart of an example of a generation process according to the first embodiment. As illustrated in FIG. 8, the receiver 131 of the generating device 100 stands by until the receiver 131 receives a text from the user terminal via, for example, the external I/F 110 (No in S100). When the receiver 131 determines that the receiver 131 has received the text (Yes in S100), the receiver 131 outputs the received text to the determiner 132.

The determiner 132 detects a word included in the received text (in S101). Then, the determiner 132 references the bit filter 121 and determines whether or not a static code associated with the detected word is already registered in the bit filter 121 (in S110).

When the determiner 132 determines that the static code is already registered (Yes in S110), the encoder 133 encodes the detected word to the static code (in S114). After that, the encoder 133 causes the process to proceed to S120.

When the determiner 132 determines that the static code is not registered (No in S110), the determiner 132 references the dynamic dictionary 122 and determines whether or not a dynamic code associated with the detected word is already registered in the dynamic dictionary 122 (in S111).

When the determiner 132 determines that the dynamic code is already registered (Yes in S111), the encoder 133 encodes the detected word to the dynamic code. After that, the encoder 133 causes the process to proceed to S120.

When the determiner 132 determines that the dynamic code is not registered (No in S111), the determiner 132 identifies the type of the detected word and outputs the identified type to the encoder 133 (in S112). Then, the encoder 133 registers the dynamic code associated with the detected word in a portion that is among the portions 122a to 122d included in the dynamic dictionary 122 and corresponds to the identified attribute information (in S113). Then, the encoder 133 causes the process to proceed to S114.

Then, the generator 134 determines whether or not all words have been detected (in S120). When the generator 134 determines that one or more of all the words have not been detected (No in S120), the process returns to S101 and is repeatedly executed.

When the generator 134 determines that all the words have been detected (Yes in S120), the generator 134 encrypts the portions 122b and 122c included in the dynamic dictionary 122 and corresponding to the personal information (in S121). Then, the generator 134 generates data by coupling encoded data with data of the encrypted portions of the dynamic dictionary 122 and data of the unencrypted portions of the dynamic dictionary 122, causes the generated data to be stored in the encrypted data 123 (in S122), and terminates the process.

Next, a process of reading a generated two-dimensional code is described. FIG. 9 is a flowchart of an example of a decoding process according to the first embodiment. As illustrated in FIG. 9, the receiver 131 of the generating device 100 stands by until the receiver 131 receives a request to output a text from the user terminal via the external I/F 110 (No in S200). When the receiver 131 determines that the receiver 131 has received the output request (Yes in S200), the receiver 131 outputs the received output request to the decoder 136.

The decoder 136 acquires the text corresponding to the output request from the encoded data 123 (in S201). Then, the decoder 136 determines whether or not the user that has transmitted the output request has the right to access the personal information (in S210).

When the decoder 136 determines that the user has the access right (Yes in S210), the decoder 136 decodes the encrypted portions 122b and 122c of the dynamic dictionary 122 (in S211). Then, the decoder 136 uses the bit filter 121 and the dynamic dictionary 122 including the decoded portions 122b and 122c to decode the encoded text (in S213) and causes the process to proceed to S214.

When the decoder 136 determines that the user does not have the access right (No in S210), the decoder 136 masks encoded data corresponding to the encrypted portions 122b and 122c of the dynamic dictionary 122 without decoding the encoded data corresponding to the encrypted portions 122b and 122c (in S212). Then, the decoder 136 decodes the encoded text using the bit filter 121 and the dynamic dictionary 122 without using the encrypted portions 122b and 122c (in S213).

Then, the output unit 135 outputs the decoded text to the user terminal via the external I/F 110 (in S214) and terminates the process.

Effects

As described above, the generating device 100 according to the first embodiment receives text information and detects a phrase that is included in the text information and is of a specific type. The generating device 100 generates encoded information by encoding the phrase of the specific type and generates the first dictionary in which the encoded information is associated with the phrase of the specific type before the encoding. Then, the generating device 100 generates a file including the generated encoded information in a first region and including encrypted dictionary information obtained by encrypting the generated first dictionary in a third region, which corresponds to the specific type among multiple second regions of the file. Thus, the generating device 100 may execute block encryption to collectively encrypt words that are included in text information and are of the specific type.

The generating device 100 determines whether or not the phrase included in the text information is already stored in the second dictionary. The generating device 100 may extract, as the phrase of the specific type, a phrase determined as not being stored in the second dictionary and generate the encoded information and the first dictionary. Thus, the generating device 100 may dynamically add a code to a word to be encrypted.

The generating device 100 may store encoded information corresponding to phrases of the specific type in storage regions different for items of the phrases of the specific type. Thus, whether or not phrases are to be encrypted may be determined for each of types.

The generating device 100 may generate a file including the third dictionary in which phrases other than the phrases of the specific type are associated with information obtained by encoding the other phrases in the process of generating the file. Thus, static codes associated with words that appear with high frequency and dynamic codes may coexist.

In addition, when the generating device 100 receives a request to output a file, the generating device 100 may determine, based on an access right of a user who has requested the output, whether or not the generating device 100 decodes the encoded information associated with the phrase of the specific type. The generating device 100 may output the text information including the phrase that has been obtained by decoding the encoded information determined to be decoded and is of the specific type. Thus, since information to be output is changed based on the access right of the user, it may be possible to suppress leakage of the information.

Second Embodiment

Although the addresses of the portions of the dynamic dictionary 122 are registered in the type table 124 illustrated in FIG. 7 in the first embodiment, the first embodiment is not limited to this. For example, when data lengths of dynamic codes and sizes of address regions are small, the number of dynamic codes may be insufficient depending on the number of words to be registered. On the other hand, when the data lengths of the dynamic codes and the sizes of the address regions are large, a data capacity may be large.

The generating device 100 may change the sizes of the address regions of the portions of the dynamic dictionary by changing the addresses registered in the type table 124 and associated with the portions based on a data capacity of a text or the number of appearing words of a specific type, for example. In addition, the generating device 100 may be configured to change the data lengths of the dynamic codes.

Figure 10:
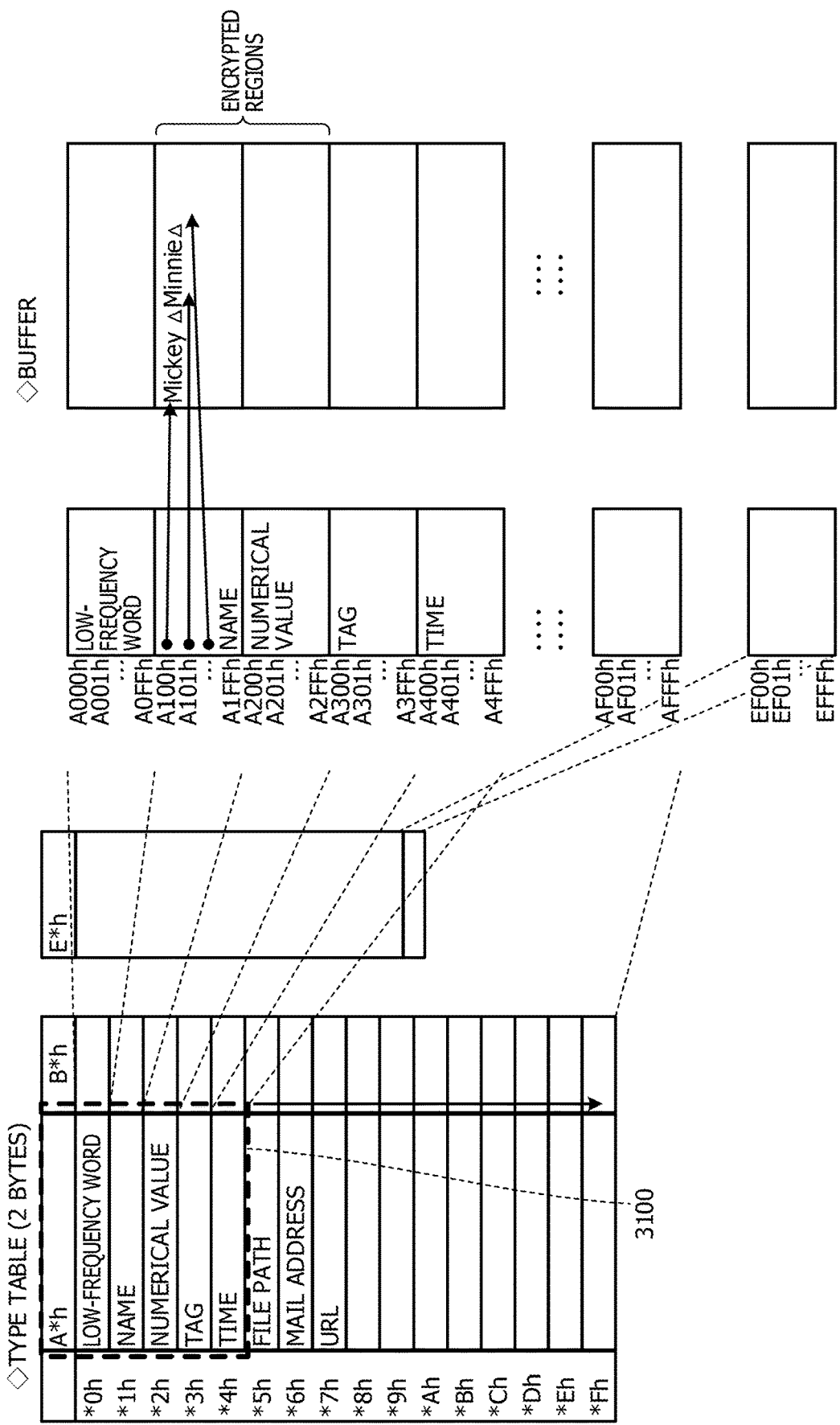
FIG. 10 is a first diagram illustrating an example of association relationships between a dynamic dictionary and encrypted regions.

FIG. 10 is a first diagram illustrating an example of association relationships between the dynamic dictionary and encrypted regions. A type table of a dynamic dictionary illustrated in FIG. 10 stores addresses at which dynamic codes assigned to words of multiple types are stored. Names and character strings are stored in buffer regions of the dynamic dictionary, and block encryption is executed to collectively encrypt the names and the character strings. FIG. 10 illustrates an example in which data lengths of dynamic codes are "2 bytes" in the type table illustrated in FIG. 10.

In FIG. 10, dynamic codes associated with the type "low-frequency word" are stored in regions of "A000h" to "A0FFh", for example. Dynamic codes associated with the type "time" are stored in regions of "A400h" to "A4FFh", for example. In this case, each of the regions may store "256" dynamic codes. A portion 3100 illustrated in FIG. 10 indicates that regions of "A000h" to "A7FFh" are assigned to 8 word types.

When there is a probability that the number of dynamic codes is insufficient, the generating device 100 may change an address associated with a type "file path" from "A500h" to "A600h". In this case, regions in which dynamic codes associated with the word type "time" are expanded to "A400h" to "A5FFh". Thus, the dynamic dictionary 122 may store "512" dynamic codes associated with the word type "time".

After the description of the regions to be assigned to dynamic codes, a configuration for changing data lengths of dynamic codes is described with reference to FIG. 11. FIG. 11 is a second diagram illustrating an example of the association relationships between the dynamic dictionary and the encrypted regions. FIG. 11 illustrates an example in which data lengths of dynamic codes are "3 bytes" in a type table illustrated in FIG. 11. A reference numeral 3200 illustrated in FIG. 11 indicates that regions of "F00000h" to "F7FFFFh" are assigned to the 8 word types. For example, a storage region indicated by reference numeral 3200 may store dynamic codes, where the number of dynamic codes stored in the storage region indicated by reference numeral 3200 is "256" times as large as the number of dynamic codes stored in the region indicated by reference numeral 3100.

Changes in the assignment of addresses in FIGS. 10 and 11 are described with reference to FIG. 12. FIG. 12 (i.e. FIGS. 12A and 12B) is a diagram illustrating an example of shifts in codes according to a second embodiment. Reference numerals 3100 and 3200 illustrated in FIG. 12 indicate the same regions as those indicated by reference numerals 3100 and 3200 illustrated in FIGS. 10 and 11. For example, when a storage destination of dynamic codes stored in the region indicated by reference numeral 3100 is changed to a storage region indicated by reference numeral 3200, the storage region indicated by reference numeral 3200 may store dynamic codes, where the number of dynamic codes stored in the storage region indicated by reference numeral 3200 is "256" times as large as the number of dynamic codes stored in the region indicated by reference numeral 3100.

Effects

As described above, the generating device 100 may determine one or more of sizes of storage regions configured to store encoded information and sizes of encoded information based on appearance frequencies of phrases of a specific type. Thus, a data size of the dynamic dictionary may be optimized.

Third Embodiment

Although the embodiments are described above, the techniques disclosed herein may be enabled in various embodiments other than the aforementioned embodiments. For example, although the first embodiment describes the example in which the generating device 100 has the configuration for determining whether or not each of the portions 122a to 122d included in the dynamic dictionary 122 is to be encrypted, the first embodiment is not limited to this. For example, the generator 134 of the generating device 100 may use encryption keys different for multiple portions included in the dynamic dictionary 122 to encrypt the multiple portions included in the dynamic dictionary 122. In addition, the decoder 136 may divide the access right of the user who has transmitted the request to output the text. Then, the decoder 136 may decode only a portion among the portions of the dynamic dictionary 122 based on a stage of the access right of the user.

As described above, the generating device 100 generates first dictionaries different for items of phrases of a specific type and uses different encryption keys to encrypt the first dictionaries for the items to generate encrypted dictionary information. Thus, the generating device 100 may determine whether or not the phrases are to be decoded based on each of the types of the phrases.

As illustrated in FIG. 3, the generating device 100 according to the first embodiment may change a masking type based on a word type and may change the number of characters to be masked, for example.

For example, as illustrated in FIG. 3, the output unit 135 may use symbols "●" to mask the portion 1312 corresponding to the name and may use symbols "x" to mask the portion 1313 corresponding to the numerical value. Although the output unit 135 outputs the 4 symbols "x" to the portion 1313 corresponding to the numerical value, the first embodiment is not limited to this. For example, to mask a 6-digit numerical value, the output unit 135 may output 6 symbols "x" to the portion 1313 corresponding to the numerical value, as indicated by the portion 1113 including the numerical value.

As described above, the generating device 100 may output text information including a character string obtained by masking a phrase, associated with encoded information determined to not be decoded, of a specific type based on a type associated with an item for the phrase of the specific type and the number of characters of the phrase of the specific type. Thus, a display method may be changed based on an item of a phrase, a length of the phrase, or the like.

System

One or more of processes that are among the processes described in the embodiments and are to be automatically executed may be manually executed. One or more of processes that are described in the embodiments and are to be manually executed may be automatically executed using a known method. The process procedures, the control procedures, the specific names, the information including the various types of data and parameters are described above in the embodiments with reference to the accompanying drawings and may be arbitrarily changed unless otherwise specified.

The constituent elements of the devices illustrated in the drawings are functionally conceptual and may not be physically configured as illustrated in the drawings. For example, specific forms of the distribution and integration of the devices may not be limited to those illustrated in the drawings. All or some of the constituent elements may be functionally or physically distributed or integrated in arbitrary units based on various loads, usage statuses, and the like. For example, the encoder 133 illustrated in FIG. 4 and the generator 134 illustrated in FIG. 4 may be integrated with each other. The receiver 131, the determiner 132, the encoder 133, and the generator 134 that are illustrated in FIG. 4 may be installed in a computer, while the output unit 135 and the decoder 136 that are illustrated in FIG. 4 may be installed in another computer. In addition, all or some of the processing functions to be executed by the devices may be executed by a CPU and a program analyzed and executed by the CPU or may be executed by hardware by wired logic.

The various processes described in the embodiments may be executed by causing a computer system such as a personal computer or a workstation to execute a program prepared in advance. An example of the computer system configured to execute the program having the same functions as described in the embodiments is described below. In addition, the same may apply to the corresponding devices in the other embodiments.

Figure 13:
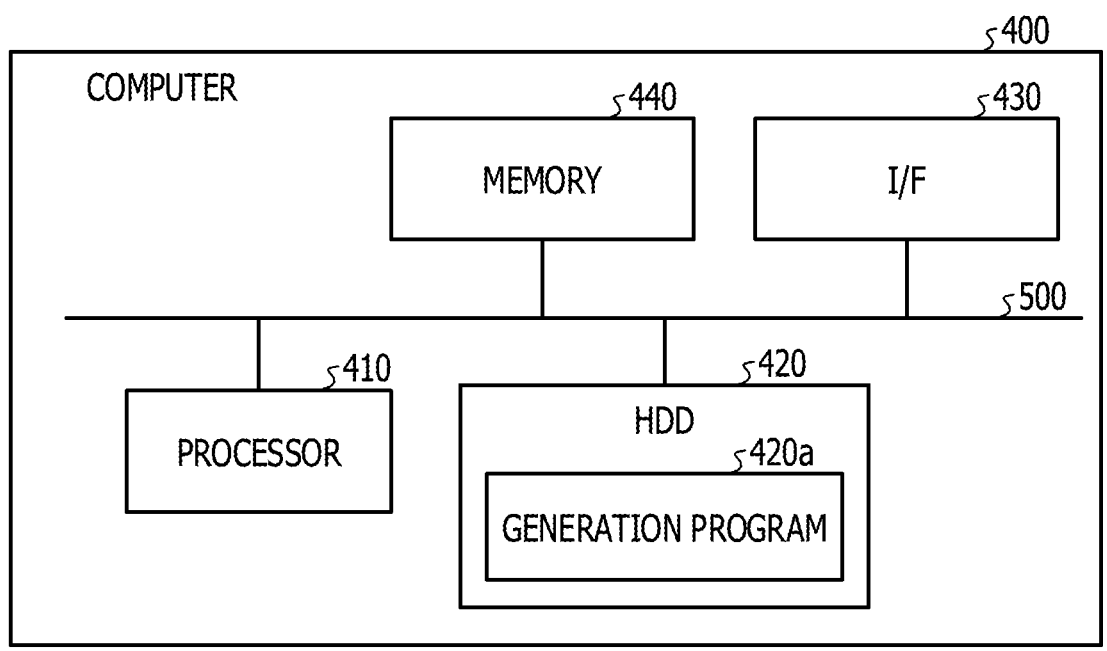
FIG. 13 is a diagram illustrating an example of a computer configured to execute a generation program.

FIG. 13 is a diagram illustrating an example of the computer configured to the generation program. As illustrated in FIG. 13, a computer 400 includes a processor 410, a hard disk drive (HDD) 420, an I/F 430, and a memory 440. The units 410 to 440 are connected to each other via a bus 500.

Examples of the processor 410 are a central processing unit (CPU), a digital signal processor (DSP), a field programmable gate array (FPGA), and a programmable logic device (PLD). Examples of the memory 440 are a random access memory (RAM) such as a synchronous dynamic random access memory (SDRAM), a read only memory (ROM), and a flash memory.

A generation program 420a is stored in the HDD 420 in advance. The generation program 420a enables the same functions as those of the receiver 131, determiner 132, encoder 133, generator 134, output unit 135, and decoder 136 of the generating device 100. The generation program 420a may be divided.

The HDD 420 stores various types of information. For example, the HDD 420 stores an OS and various types of data to be used for searches.

The I/F 430 corresponds to the external I/F 110 described together with the functional units and is, for example, a network interface card.

Then, the processor 410 reads the generation program 420a from the HDD 420 and executes the generation program 420a, thereby executing the same operations as those of the processing units described in the embodiments. For example, the generation program 420a executes the same operations of those of the receiver 131, the determiner 132, the encoder 133, the generator 134, the output unit 135, and the decoder 136.

The generation program 420a may not be stored in the HDD 420 in an initial state.

For example, the generation program 420a may be stored in a "portable physical medium" to be inserted in the computer 400. The "portable physical medium" is a flexible disk (FD), a CD-ROM, a DVD, a magneto-optical disc, an IC card, or the like. The computer 400 may read the generation program 420a from the portable physical medium and execute the generation program 420a.

The generation program 420a may be stored in "another computer (or server" connected to the computer 400 via a public line, the Internet, a LAN, a WAN, or the like. The computer 400 may read the generation program 420a from the other computer and execute the generation program 420a.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method for generating a file, the method comprising:
executing a reception process that includes receiving text information;
executing a first generation process that includes
obtaining one or more of detected phrases by detecting a phrase of a specific type from among the received text information,
generating, for a respective detected phrase, encoded information by converting the respective detected phrase into a corresponding code word, and
generating a first dictionary including a pair of the respective detected phrase and the corresponding code word; and
executing a second generation process that includes
performing a block encrypting of the first dictionary to generate an encrypted dictionary information, and
generating a first file including a first region and multiple second regions to output the generated first file, the first region being configured to store the encoded information,
wherein a third region corresponding to the specific type among the second regions is configured to store the encrypted dictionary information.

2. The method according to claim 1, further comprising:
executing a first determination process that includes determining whether or not the phrase included in the text information is already stored in a second dictionary,
wherein the first generation process is configured to extract, as the phrase of the specific type, a phrase determined as not being stored in the second dictionary and generate the encoded information and the first dictionary.

3. The method according to claim 1,
wherein the second generation process is configured to generate the first file further including a third dictionary in which a certain phrase other than the phrase of the specific type is associated with information obtained by encoding the certain phrase.

4. The method according to claim 1,
wherein the first generation process is configured to generate different first dictionaries in storage regions different for items of phrases of the specific type, and
wherein the second generation process is configured to use different encryption keys to encrypt the first dictionaries for the items to generate the encrypted dictionary information.

5. The method according to claim 1, further comprising:
executing a second determination process that includes
determining, when a request to output the first file is received, whether or not the encoded information associated with the phrase of the specific type is to be decoded, based on an access right of a person who has requested the output, and
outputting text information including the phrase that is of the specific type and has been obtained by decoding the encoded information determined to be decoded.

6. The method according to claim 5,
wherein the second determination process is configured to output text information including a character string obtained by masking, based on a type associated with an item of the phrase of the specific type or the number of characters of the phrase of the specific type, the phrase that is of the specific type and associated with the encoded information determined to not be decoded.

7. The method according to claim 1, further comprising:
executing a determination process that includes determining, based on an appearance frequency of the phrase of the specific type, either or both of a size of a storage region configured to store the encoded information and a size of the encoded information.

8. An apparatus for generating a file, the apparatus comprising:
a memory; and
a processor coupled to the memory and configured to
execute a reception process that includes receiving text information;

execute a first generation process that includes
obtaining one or more of detected phrases by detecting a phrase of a specific type from among the received text information,
generating, for a respective detected phrase, encoded information by converting the respective detected phrase into a corresponding code word, and
generating a first dictionary including a pair of the respective detected phrase and the corresponding code word;
execute a second generation process that includes
performing a block encrypting of the first dictionary to generate an encrypted dictionary information, and
generating a first file including a first region and multiple second regions to output the generated first file, the first region being configured to store the encoded information,
wherein a third region corresponding to the specific type among the second regions is configured to store the encrypted dictionary information.

9. The apparatus according to claim 8,
wherein the processor is configured to execute a first determination process that includes determining whether or not the phrase included in the text information is already stored in a second dictionary,
wherein the first generation process is configured to extract, as the phrase of the specific type, a phrase determined as not being stored in the second dictionary and generate the encoded information and the first dictionary.

10. The apparatus according to claim 8,
wherein the second generation process is configured to generate the first file further including a third dictionary in which a certain phrase other than the phrase of the specific type is associated with information obtained by encoding the certain phrase.

11. The apparatus according to claim 8,
wherein the first generation process is configured to generate different first dictionaries in storage regions different for items of phrases of the specific type, and
wherein the second generation process is configured to use different encryption keys to encrypt the first dictionaries for the items to generate the encrypted dictionary information.

12. The apparatus according to claim 8,
wherein the processor is further configured to
execute a second determination process that includes
determining, when a request to output the first file is received, whether or not the encoded information associated with the phrase of the specific type is to be decoded, based on an access right of a person who has requested the output, and
outputting text information including the phrase that is of the specific type and has been obtained by decoding the encoded information determined to be decoded.

13. The apparatus according to claim 12,
wherein the second determination process is configured to output text information including a character string obtained by masking, based on a type associated with an item of the phrase of the specific type or the number of characters of the phrase of the specific type, the phrase that is of the specific type and associated with the encoded information determined to not be decoded.

14. The apparatus according to claim 8,
wherein the processor is configured to execute a determination process that includes determining, based on an appearance frequency of the phrase of the specific type, either or both of a size of a storage region configured to store the encoded information and a size of the encoded information.

15. A non-transitory computer-readable storage medium for storing a program which causes a processor to perform processing for generating a file, the processing comprising:
executing a reception process that includes receiving text information;
executing a first generation process that includes
obtaining one or more of detected phrases by detecting a phrase of a specific type from among the received text information,
generating, for a respective detected phrase, encoded information by converting the respective detected phrase into a corresponding code word, and
generating a first dictionary including a pair of the respective detected phrase and the corresponding code word; and
executing a second generation process that includes
performing a block encrypting of the first dictionary to generate an encrypted dictionary information, and
generating a first file including a first region and multiple second regions to output the generated first file, the first region being configured to store the encoded information,
wherein a third region corresponding to the specific type among the second regions is configured to store the encrypted dictionary information.

16. The non-transitory computer-readable storage medium according to claim 15,
wherein the processing further comprises executing a first determination process that includes determining whether or not the phrase included in the text information is already stored in a second dictionary,
wherein the first generation process is configured to extract, as the phrase of the specific type, a phrase determined as not being stored in the second dictionary and generate the encoded information and the first dictionary.

17. The non-transitory computer-readable storage medium according to claim 15,
wherein the second generation process is configured to generate the first file further including a third dictionary in which a certain phrase other than the phrase of the specific type is associated with information obtained by encoding the certain phrase.

18. The non-transitory computer-readable storage medium according to claim 15,
wherein the first generation process is configured to generate different first dictionaries in storage regions different for items of phrases of the specific type, and
wherein the second generation process is configured to use different encryption keys to encrypt the first dictionaries for the items to generate the encrypted dictionary information.

19. The non-transitory computer-readable storage medium according to claim 15,
wherein the processing further comprises executing a second determination process that includes
determining, when a request to output the first file is received, whether or not the encoded information associated with the phrase of the specific type is to be decoded, based on an access right of a person who has requested the output, and outputting text information including the phrase that is of the specific type and has been obtained by decoding the encoded information determined to be decoded.

20. The method according to claim 19, wherein the second determination process is configured to output text information including a character string obtained by masking, based on a type associated with an item of the phrase of the specific type or the number of characters of the phrase of the specific type, the phrase that is of the specific type and associated with the encoded information determined to not be decoded.

\* \* \* \* \*